United States Patent
Sogabe et al.

(10) Patent No.: US 8,662,297 B2
(45) Date of Patent: Mar. 4, 2014

(54) COVER FOR PORTABLE ELECTRONIC DEVICE

(75) Inventors: Takashi Sogabe, Tokyo (JP); Yuko Hirayama, Tokyo (JP); Atsushi Watanabe, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 143 days.

(21) Appl. No.: 13/274,552

(22) Filed: Oct. 17, 2011

(65) Prior Publication Data

US 2012/0305424 A1 Dec. 6, 2012

(30) Foreign Application Priority Data

Jun. 6, 2011 (JP) ................................. 2011-126791
Sep. 13, 2011 (JP) ................................. 2011-199859

(51) Int. Cl.
*B65D 85/00* (2006.01)

(52) U.S. Cl.
USPC .......................................... 206/320; 206/472

(58) Field of Classification Search
USPC .......... 206/302, 472, 320, 576, 701, 722, 475
See application file for complete search history.

(56) References Cited

U.S. PATENT DOCUMENTS

| | | | |
|---|---|---|---|
| 2,786,281 A * | 3/1957 | Kramer et al. ................. | 206/472 |
| 5,530,234 A | 6/1996 | Loh | |
| 5,549,203 A * | 8/1996 | Weisburn et al. .............. | 206/472 |
| 5,682,182 A | 10/1997 | Tsubosaka | |
| 6,239,968 B1 * | 5/2001 | Kim et al. ................. | 361/679.56 |
| 6,445,577 B1 * | 9/2002 | Madsen et al. .............. | 361/679.3 |
| 6,994,215 B2 * | 2/2006 | Kim ............................... | 206/445 |
| 2003/0006164 A1 * | 1/2003 | Mateus et al. ................. | 206/701 |
| 2007/0202956 A1 | 8/2007 | Ogasawara | |
| 2007/0215501 A1 * | 9/2007 | Hanson et al. ................. | 206/320 |
| 2007/0227923 A1 * | 10/2007 | Kidakarn ....................... | 206/320 |
| 2007/0246386 A1 * | 10/2007 | Nykoluk et al. .............. | 206/320 |

FOREIGN PATENT DOCUMENTS

| | | |
|---|---|---|
| JP | 04237361 A | 8/1992 |
| JP | 07107419 A | 4/1995 |
| JP | 08241283 A | 9/1996 |
| JP | 3092458 U | 3/2003 |
| JP | 2003132035 A | 5/2003 |
| JP | 3145420 U | 10/2008 |
| JP | 2009178373 A | 8/2009 |
| JP | 2010171698 A | 8/2010 |
| WO | 2010009675 A | 1/2010 |

OTHER PUBLICATIONS

Office Action and partial translation for corresponding JP 2011-199859, dated Nov. 15, 2011.

* cited by examiner

*Primary Examiner* — Jacob K Ackun

(74) *Attorney, Agent, or Firm* — Matthew B. Dernier, Esq.; Gibson & Dernier LLP

(57) ABSTRACT

An object is to provide a cover for allowing an operation to an operating part provided on the rear surface of a portable electronic device when the electronic device being used. A cover includes a front cover plate, a rear cover plate, and an attachment member capable of being attached the electronic device. The front cover plate and the rear cover plate are connected to the attachment member such that each relative angle thereof relative to the attachment member are changeable.

11 Claims, 10 Drawing Sheets

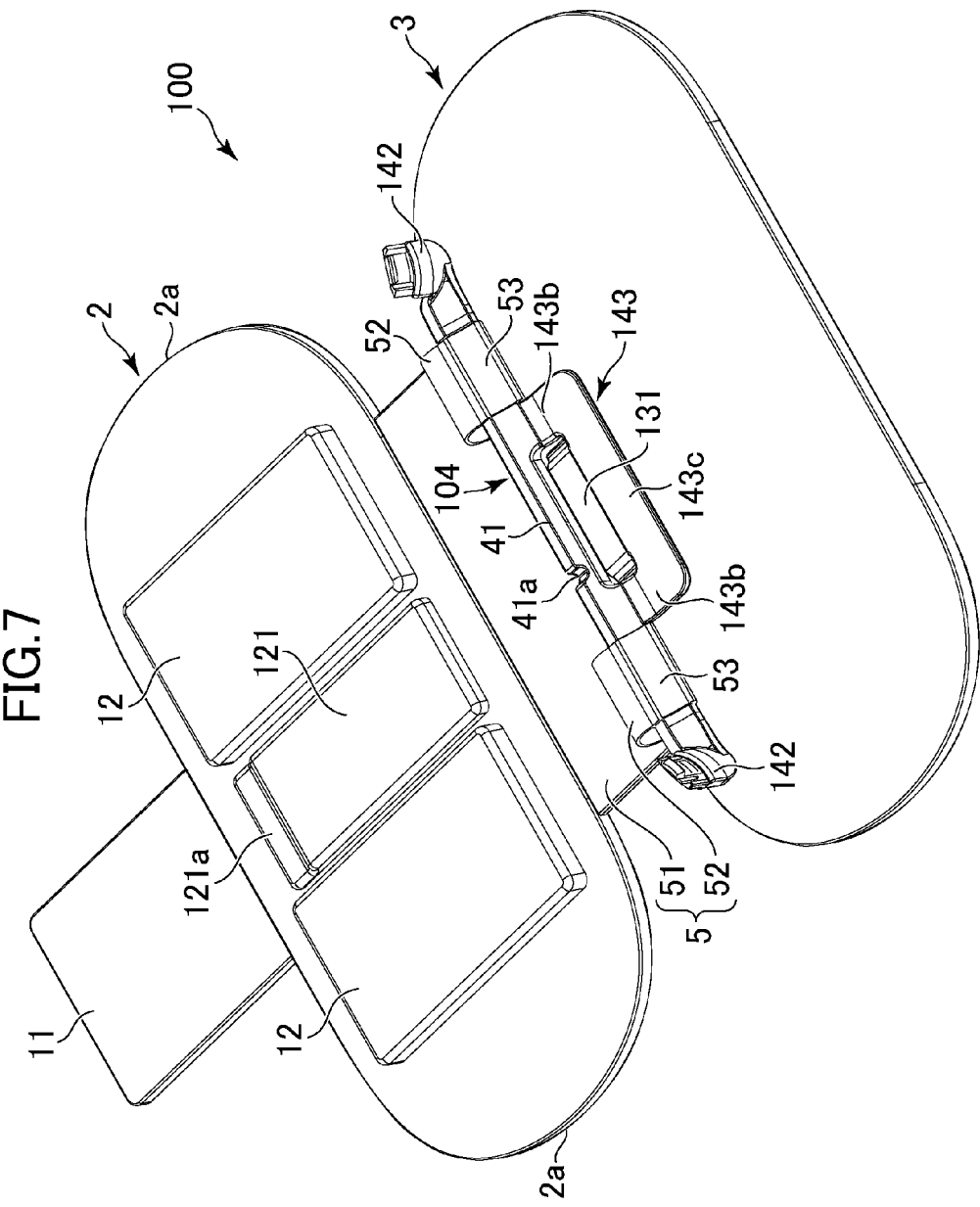

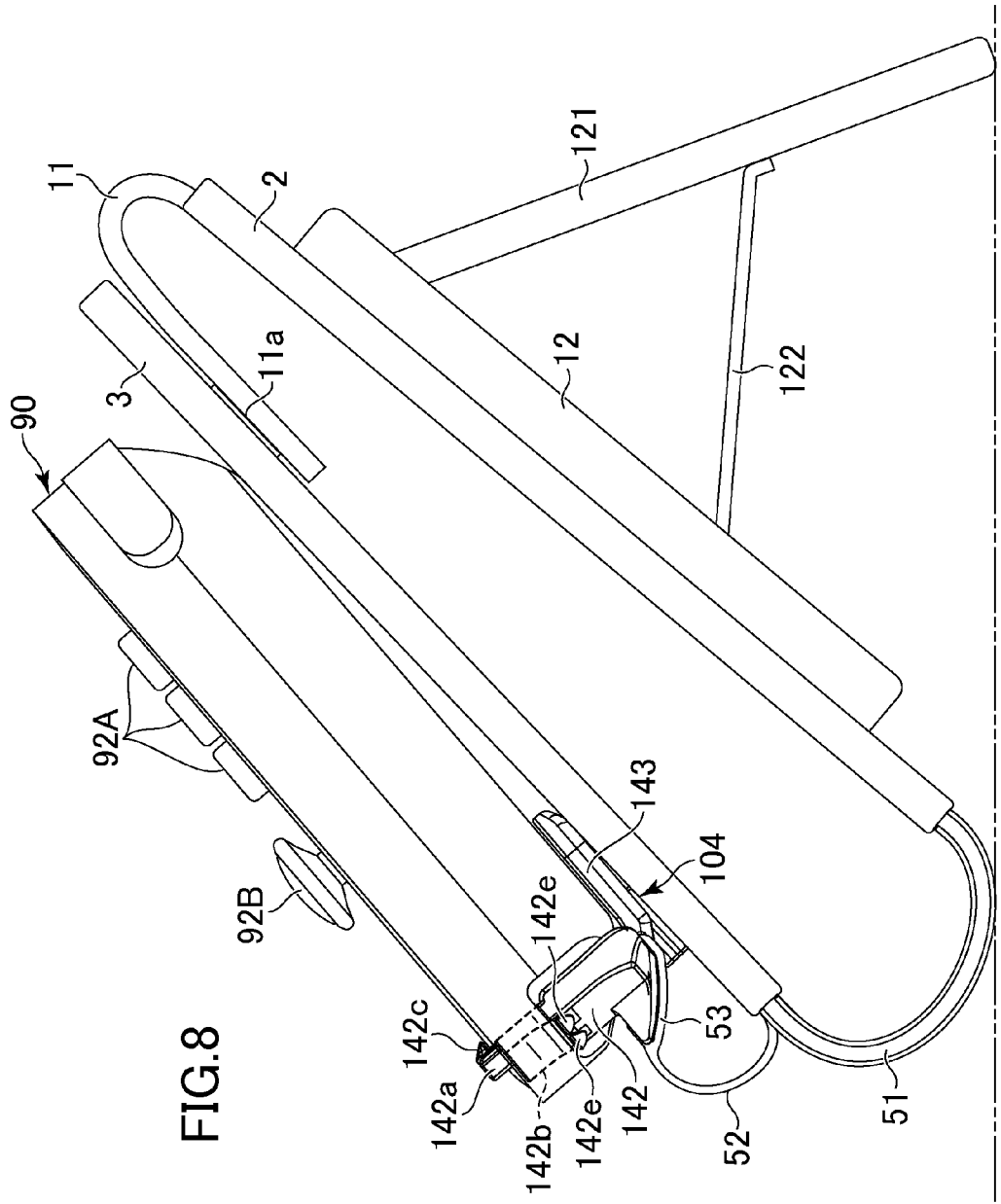

US 8,662,297 B2

COVER FOR PORTABLE ELECTRONIC DEVICE

CROSS-REFERENCE TO RELATED APPLICATION

The present application claims priority from Japanese application JP2011-126791 filed on Jun. 6, 2011 and Japanese application JP2011-199859 filed on Sep. 13, 2011, the content of which are hereby incorporated by reference into this application.

BACKGROUND OF THE INVENTION

1. Field of the Invention

The present invention relates to a cover for a portable electronic device having a display screen on the front surface thereof and an operating member for user operation on the rear surface thereof.

2. Description of the Related Art

Conventionally, portable electronic devices having a display screen on the front surface thereof have been used (see, e.g., U.S. Patent Application Publication No. 2007/0202956). Such an electronic device may often be exposed to shock, dust, and dirt when being carried. Therefore, a case or a cover for protecting the electronic device has been used.

SUMMARY OF THE INVENTION

Some electronic devices require a work to be performed on the rear side thereof. For example, the electronic device in the above Patent Document has a slot for receiving a recording medium on the rear surface thereof. When using the above electronic device, a user first opens a cover provided to the rear surface of the electronic device, and then inserts a recording medium into the slot.

According to one aspect of the present invention, there is provided a cover for a portable electric device having a display screen arranged on a front surface thereof and an operating part arranged on a rear surface thereof. The cover includes a front cover plate for covering the front surface of the electronic device, a rear cover for covering the rear surface of the electronic device, and an attachment member capable of being attached to an edge of the electronic device. The front cover plate is connected to the attachment member such that a relative angle between the front cover plate and the attachment member is changeable. Further, the rear cover plate is connected to the attachment member such that a relative angle between the rear cover plate and the attachment member is changeable.

According to the above cover, the front cover plate and the rear cover plate are both able to open and close relative to the electronic device. Consequently, in a state where the cover is attached to the electronic device, a user can not only look at the display screen on the front surface but also operate the operating part on the rear surface.

BRIEF DESCRIPTION OF THE DRAWINGS

FIG. 7 is a perspective view of a cover open according to a second example.

FIG. 8 is a side view of the cover shown in FIG. 7. In this figure, the cover functions as a stand.

FIG. 9 is a diagram showing an attachment member of the cover shown in FIG. 7.

DETAILED DESCRIPTION OF THE INVENTION

Figure 1:
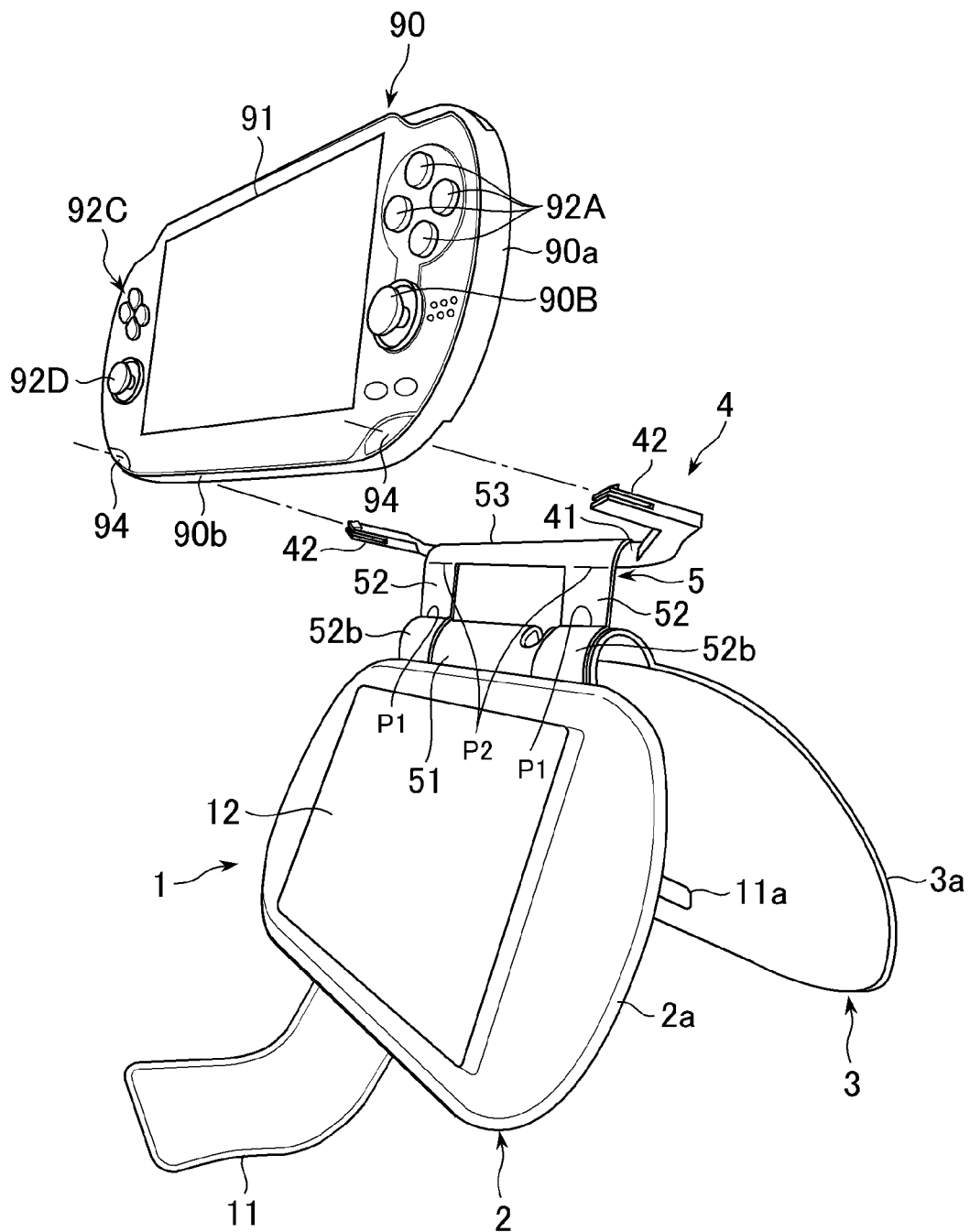
FIG. 1 is a perspective view of a cover according to one embodiment of the present invention and a portable electronic device that can be stored in the cover.
Figure 2:
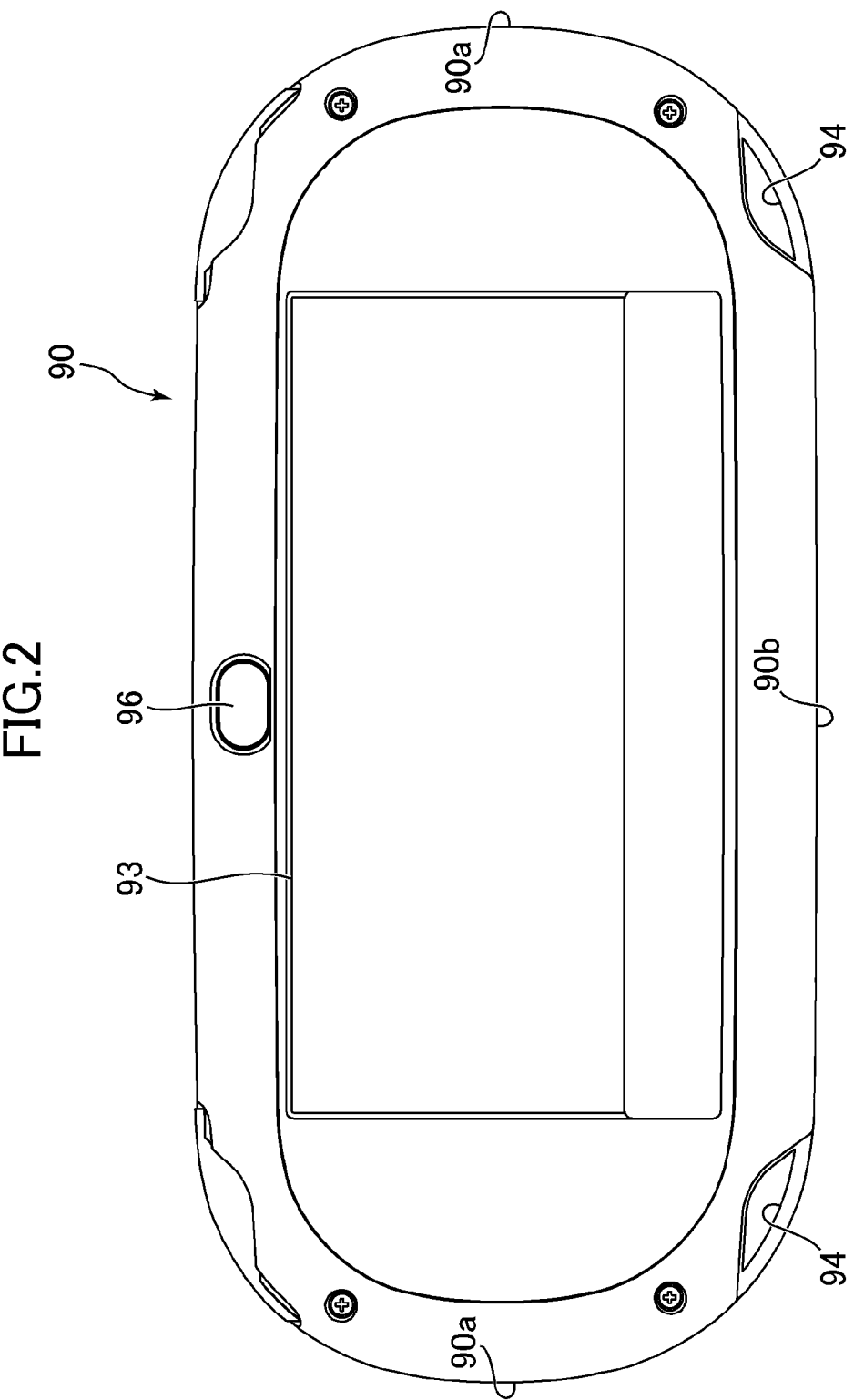
FIG. 2 is a rear elevation view of the electronic device.
Figure 3:
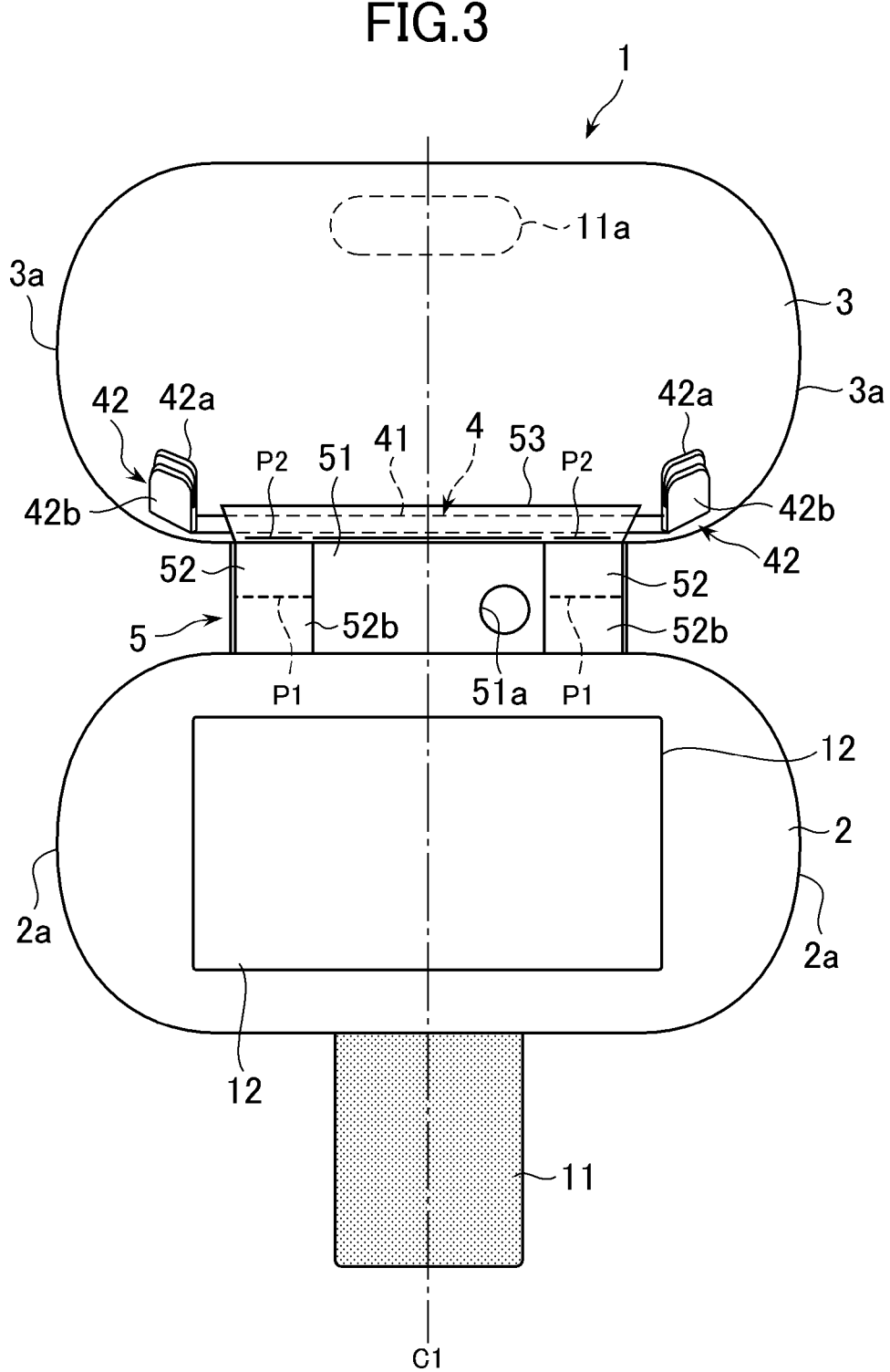
FIG. 3 is a plan view of the cover.
Figure 4:
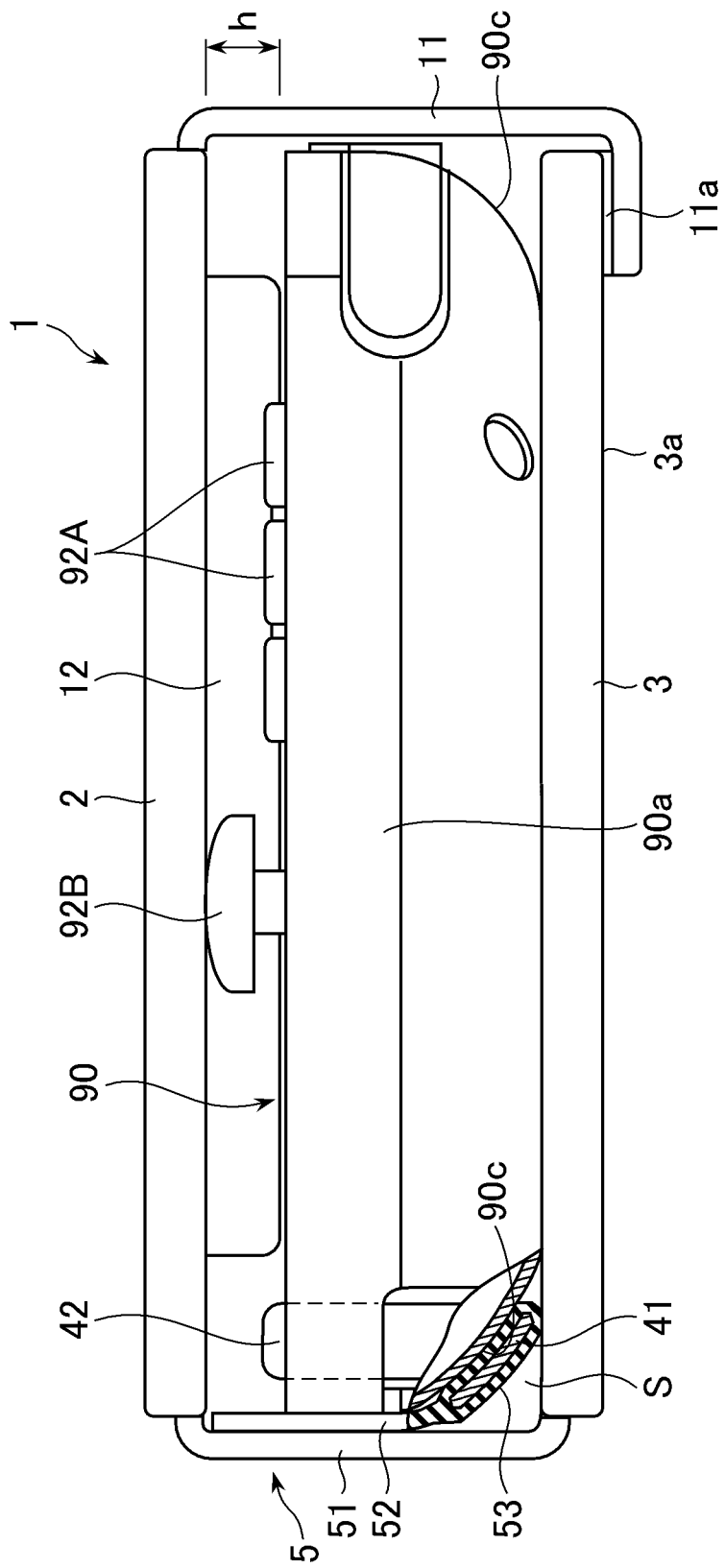
FIG. 4 is a side view of the cover with the electronic device stored.
Figure 5:
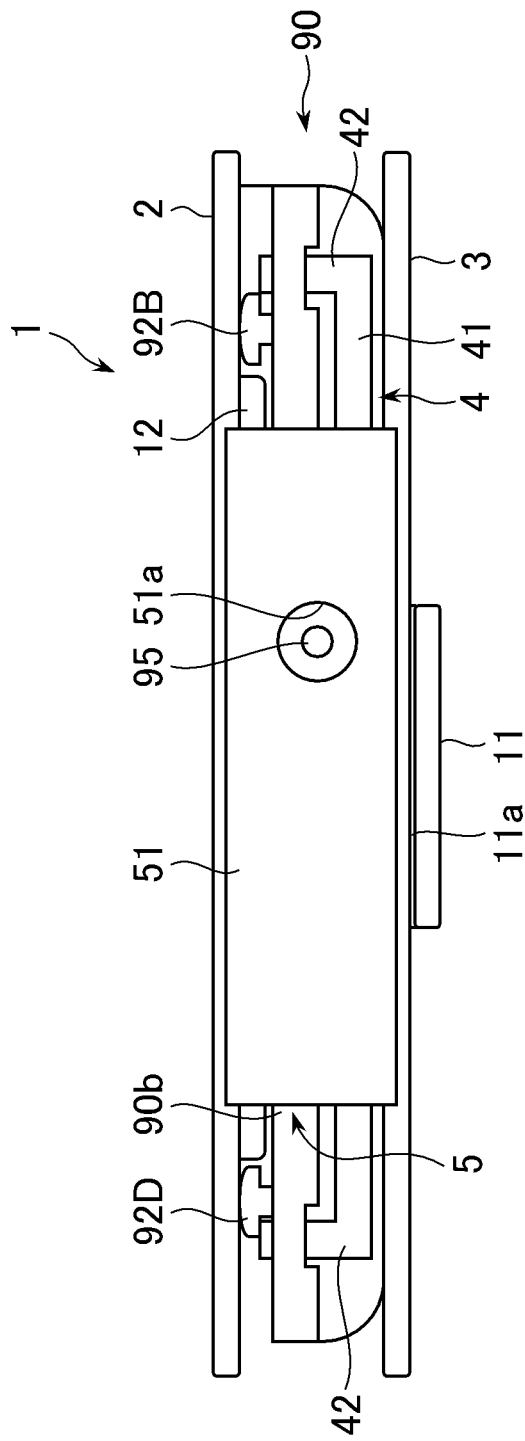
FIG. 5 is a bottom view of the cover with the electronic device stored.

In the following, an embodiment of the present invention will be described reference to the accompanying drawings. FIG. 1 is a perspective view of a cover 1 according to one embodiment of the present invention and a portable electronic device 90 that can be stored in the cover 1. FIG. 2 is a rear elevation view of the electronic device 90. FIG. 3 is a plan view of the cover 1. FIG. 4 is a side view of the cover 1 with the electronic device 90 stored. FIG. 5 is a bottom view of the cover 1 with the electronic device 90 stored.

As shown in FIG. 1, an electronic device 90 in this example is a device having a shape of an elongate substantially rectangular solid that is elongated in the left-right direction. The electronic device 90 has a display screen 91 on the front surface thereof. The electronic device 90 is a device that functions as a game device, a motion image reproducing device, and a communication device, and accordingly includes, to the left and right of the display screen 91, a plurality of operating members for user operation provided. Specifically, a plurality of operation buttons 92A and an operating stick 92B are arranged to the right of the display screen 91. A directive key 92C having a cross shape as a whole and an operating stick 92D are arranged to the left of the display screen 91. These operating members 92A to 92D project from the front surface of the electronic device 90.

The electronic device 90 has an operating part provided on the rear surface thereof for user operation. Specifically, the electronic device 90 in this example has a rear touch panel 93 as an operating part, as shown in FIG. 2. Thus, a user can operate the rear touch panel 93 provided on the rear surface with his/her middle or index finger, while holding the right or left part of the electronic device 90 where the operating members 92A to 92D are provided. For example, a user can scroll an image shown on the display screen 91 and move a pointer shown on the image by moving his/her finger on the rear touch panel 93. The electronic device 90 in this example additionally has a camera 96 on the rear surface thereof. A user can capture an image in a direction in which the rear surface faces, using the camera 96, by operating any of the operating members 92A to 92D.

As shown in FIGS. 1 and 4, the cover 1 includes a front cover plate 2 for covering the front surface of the electronic device 90 and a rear cover plate 3 for covering the rear surface of the electronic device 90. The cover plates 2, 3 respectively have shapes in conformity with the front and rear surfaces of the electronic device 90, so that the front and rear surfaces of the electronic device 90 can be fully covered. The electronic device 90 in this example has a lateral surface 90a that is curved into an arc shape, and therefore the left and right edges 2a, 3a of the respective cover plates 2, 3 are also curved in conformity with the lateral surface 90a. The cover plate 2, 3 is more rigid than a connection member 5 to be described later. For example, the cover plate 2, 3 includes a base board made of plastic or the like, of which front surface may be covered by a dressing sheet or a cushioning sheet. Incidentally, as shown in FIG. 4, when the electronic device 90 is stored in the cover 1, the lateral surface 90a of the electronic device 90 is exposed in the left-right direction.

As shown in FIG. 1, the cover 1 has an attachment member 4 to be attached to the edge (the lower edge, in this example) 90b of the electronic device 90. The attachment member 4 is connected to the cover plates 2, 3. Specifically, the cover plates 2, 3 are connected to the attachment member 4 such that each relative angle thereof relative to the attachment member 4 is changeable. That is, the relative angle between the front cover plate 2 and the attachment member 4 is changeable. Similarly, the relative angle between the rear cover plate 3 and the attachment member 4 is changeable. Accordingly, each of the cover plate 2, 3 can move relative to the attachment member 4 so as to open and close. The cover plate 2, 3 can be connected to the electronic device 90 only through the attachment member 4, and thereby the cover plate 2, 3 can change the relative angle thereof relative to the attachment member 4 when a holder belt 11, to be described later, is released. That is, the cover 1 can move between the position shown in FIG. 4 and the position shown in FIG. 1. The cover 1 having such a shape allows a user to operate the operating members 92A to 92D and the rear touch panel 93, while keeping the cover 1 attached to the electronic device 90. A specific structure for changing the relative angle between the attachment member 4 and the cover plate 2, 3 will be described later in detail.

As shown in FIGS. 1 and 5, the attachment member 4 includes a plurality of (two in this example) fixing portions 42 positioned apart from each other in the direction along the lower edge 90b of the electronic device 90 (that is, the left-right direction) and capable of being attached to the lower edge 90b of the electronic device 90 (the direction along the lower edge 90b hereinafter simply referred to as the left-right direction). Such a structure of the attachment member 4 can more stabilize the relative positions between the attachment member 4 and the electronic device 90, compared to a structure in which the attachment member 4 is attached to the electronic device 90, using a single fixing portion.

As shown in FIG. 3, the attachment member 4 in the example includes an elongate bar frame 41 that is long in the left-right direction 1. The fixing portions 42 are formed at the respective both ends of the frame 41. These two fixing portions 42 can be respectively attached to the both ends of the lower edge 90b of the electronic device 90, as shown in FIG. 1.

The fixing portion 42 has a structure capable of engaging with the electronic device 90. That is, the fixing portion 42 can be hooked on the electronic device 90 whereby the attachment member 4 is fixed to the electronic device 90. Accordingly, a user can attach the attachment member 4 to the electronic device 90 without using any other member or a tool.

The electronic device 90 in this example has a fixing hole 94 formed in each of the both end portions of the lower edge 90b (see FIGS. 1 and 2). The fixing hole 94 in this example penetrates the housing of the electronic device 90 in the thickness direction of the display screen 91. The fixing portion 42 is formed so as to be hooked on the edge of the fixing hole 94 of the electronic device 90. In this example, the fixing portion 42 is capable of fitting inside the fixing hole 94, and being hooked on the edge of the fixing hole 94. As described above, the fixing hole 94 penetrates in the thickness direction of the display screen 91. Such structures of the electronic device 90 and the attachment member 4 can prevent the fixing portion 42 from being readily removed from the electronic device 90.

That is, the electronic device 90 is held by a user when being used such that the display screen 91 faces forward. The fixing hole 94 penetrates the electronic device 90 in the thickness direction of the display screen 91, and thereby the vertical direction, that is, the direction in which the weight of the cover 1 is applied to the electronic device 90, is substantially perpendicular to the direction in which the fixing portion 42 is inserted into the fixing hole 94. Consequently, the fixing portion 42 is prevented from being removed from the electronic device 90. Incidentally, the fixing portion 42 fits into the fixing hole 94 from the rear of the electronic device 90.

Figure 6:
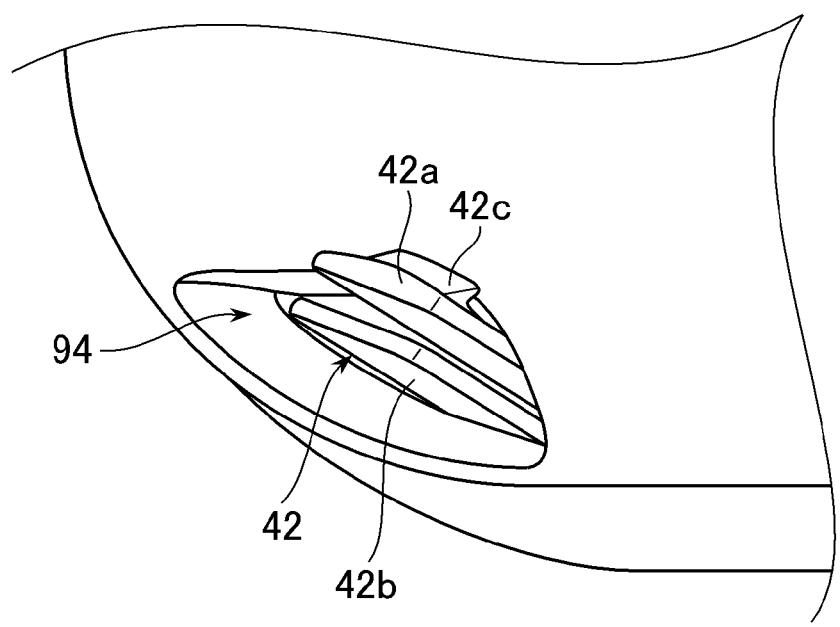
FIG. 6 is an enlarged perspective view of a fixing portion formed in an attachment member of the cover. In this figure, the fixing portion is engaged with the electronic device.

FIG. 6 is an enlarged perspective view of the fixing portion 42 engaged with the electronic device 90. The tip end of the fixing portion 42 is split into two. That is, the fixing portion 42 includes a pair of projections 42a, 42b extending from the end of the flame 41 in the same direction and facing each other. One projection (a projection closer to the center of the front surface of the electronic device 90) 42a has a prong 42c projecting toward a side opposite from the other projection 41b and capable of being hooked on the edge of the fixing hole 94. That is, the fixing portion 42 is fixed to the fixing hole 94 by the prong 42c. Incidentally, the prong 42c may be formed on the projection 42b as well.

The projections 42a, 42b are elastically deformable so as to approach to each other. That is, the projection 42a, 42b are elastically deformable such that the interval therebetween becomes smaller. In inserting the fixing portion 42 into the fixing hole 94, the interval between the two projections 42a, 42b becomes temporarily smaller, so that the fixing portion 42 can pass through the fixing hole 94. The projections 42a 42b, once inserted in the fixing hole 94, are pressed onto the inner surface of the fixing hole 94 due to elasticity thereof. Consequently, the hooking by the prong 42c in the fixing hole 94 is stabilized.

The projection 42a, 42b in this example is formed like a small plate. As shown in FIG. 3, the projections 42a, 42b of the fixing portion 42 formed on one end of the frame 41 and those projections 42a, 42b on the other end are not parallel to, but diagonal to, the left-right direction, such that they respectively face toward the central line Cl that defines a center in the left-right direction of the attachment member 4. This arrangement makes it less likely that the attachment member 4 is displaced in the left-right direction relative to the electronic device 90 even when the fixing portion 42 does not fully match in size to the fixing hole 94.

The fixing portion 42 and the frame 41 are made of material, e.g., plastic or metal, that is more rigid than the connection member 5 to be described later. Accordingly, sufficient strength for attachment to the electronic device 90 can be obtained. The two fixing portions 42 and the frame 41 are integrally made of plastic or the like. This can reduce the number of components in use.

As shown in FIG. 4, the frame 41 has an arc cross section perpendicular to the longitudinal direction (left-right direction) thereof. That is, the frame 41 has a curved cross section. Accordingly, the frame 41 is less likely to bend, compared to a bar having a flat cross section.

In this example, as shown in FIG. 4, the outer circumference 90c of the rear surface of the electronic device 90 is also curved, and the frame 41 is curved in conformity with the outer circumference 90c. The frame 41 is arranged close to the outer circumference 90c. Specifically, when the electronic device 90 is stored in the cover 1, the frame 41 is positioned in the space S enclosed by the outer circumference 90c, the rear cover plate 3, and a first connection portion 51 to be described later. That is, the shape of the frame 41 can effectively uses a small space defined between the electronic device 90 and the cover 1.

As shown in FIGS. 1 and 3, the cover 1 includes the connection member 5 for connecting the cover plates 2, 3 and the attachment member 4. The connection member 5 includes a first connection portion 51 for connecting an edge of the front cover plate 2 and an edge of the rear cover plate 3 that is opposed to the edge of the front cover plate 2. The first connection portion 51 has flexibility, and thereby the cover plate 2, 3 can be easily opened and closed. The first connection portion 51 can be formed using, e.g., elastomer, textile and so forth. Incidentally, the two cover plates 2, 3 are connected only through the first connection portion 51 and a holder belt 11 to be described later that is used when the electronic device 90 is stored.

The first connection portion 51 in this example is a sheet that is elongated in the left-right direction. As shown in FIG. 5, when the electronic device 90 is stored, the first connection portion 51 covers the lower surface of the electronic device 90. A connector 95 is arranged on the lower surface of the electronic device 90. The first connection portion 51A has hole 51a formed thereon through which the connector 95 is exposed. The connector 95 is, e.g., a headphone jack, and alternatively may be a charge connector to which a line for charging the electronic device 90 is connected.

The attachment member 4 is connected to the first connection portion 51 through a second connection portion 52 to be described later. This structure can reduce imbalance between a load applied from the front cover plate 2 to the electronic device 90 and a load applied from the rear cover plate 3 to the electronic device 90, when the cover plates 2, 3 is open as shown in FIG. 1. Consequently, a user can comfortably hold the electronic device 90 when using the device 90.

As shown in FIGS. 1 and 3, the connection member 5 includes the second connection portion 52 in addition to the first connection portion 51. The second connection portion 52 in this example is like a belt extending from the attachment member 4 to the cover plates 2, 3. Therefore, when the cover plate 2, 3 is open, the cover plate 2, 3 is positioned apart from the lower edge 90b of the electronic device 90. Consequently, it is possible to prevent the cover plate 2, 3 from hindering an operation to the electronic device 90 when using the electronic device 90.

As shown in FIGS. 1 and 3, the connection member 5 in this example includes a plurality of (two in this example) second connection portions 52 positioned apart from each other in the left-right direction. The two second connection portions 52 are respectively connected to the both ends of the frame 41 of the attachment member 4. Specifically, the connection member 5 includes a holding portion 53 for holding the frame 41. The tip ends of the two second connection portions 52 are connected to the holding portion 53.

Similar to the first connection portion 51, the second connection portion 52 has flexibility. For example, the second connection portion 52 may be formed using elastomer or textile. This can simplify a structure for opening and closing the cover plate 2, 3 relative to the electronic device 90, while maintaining the attachment member 4 fixed to the electronic device 90.

As described above, the attachment member 4 is connected to the first connection portion 51 through the second connection portion 52. As shown in FIGS. 1 and 3, the connection position P1 where the second connection portion 52 is connected to the first connection portion 51 is at the substantially middle between the edge of the front cover plate 2 and the edge of the rear cover plate 3 which are connected to each other through the first connection portion 51. This structure can balance a load applied form the front cover plate 2 to the electronic device 90 and a load applied from the rear cover plate 3 to the electronic device 90 balanced. In this regard, the second connection portion 52 has an attached portion 52b that extends further from the connection position P1 to be attached to the first connection portion 51. The attached portion 52b is, e.g., adhered to or sewed onto the first connection portion 51.

As described above, the cover plates 2, 3 are connected to the attachment member 4 such that each relative angle thereof relative to the attachment member 4 is changeable. In this example, the second connection portion 52 is connected to the first connection portion 51 at the connection position P1 such that the angle thereof relative to the first connection portion 51 is changeable. Specifically, the second connection portion 52 has flexibility and the attached portion 52b is attached to the first connection portion 51 by means of adhering or sewing, and thereby the second connection portion 52 can change the angle thereof relative to the first connection portion 51. Further, in this example, the second connection portion 52 is connected to the holding portion 53 at the connection position P2 such that the angle thereof relative to the holding portion 53 for holding the attachment member 4 is freely changeable. In this example, the holding portion 53 is made of flexible material integral to the second connection portion 52. This structure allows the second connection portion 52 to change the angle thereof relative to the holding portion 53. As the cover plates 2, 3 are connected to the attachment member 4 through such first connection portion 51 and second connection portion 52, the cover plates 2, 3 can respectively change their angles relative to the attachment member 4 around the respective two connection positions P1, P2.

As described above, the cover 1 has the holder belt 11 for keeping the cover plates 2, 3 closed. As shown in FIGS. 1 and 3, the holder belt 11 in this example is provided on a side opposite from the first connection portion 51 across the front cover plate 2. Meanwhile, as shown in FIG. 4, the rear cover plate 3 includes an attachment portion 11a for fixing an end of the holder belt 11. In this example, the attachment portion 11a is formed on the outer surface 3a of the rear cover plate 3. The holder belt 11 and the attachment portion 11a for the holding belt 11 may be, e.g., hook-and-loop fasteners (Velcro (registered trademark)).

As shown in FIGS. 1 and 3, the front cover plate 2 includes a convex portion 12 formed on one surface thereof (a surface facing toward inside when the cover plates 2, 3 is closed). The convex portion 121 includes a base material made of rigid material, such as plastic. The convex portion 12 is positioned at the substantially middle in the left-right direction of the cover plate 2, and when the electronic device 90 is stored, positioned between the operating members 92A, 92B on the right side and the operating members 92C, 92D on the left side. As shown in FIG. 4, the height h of the convex portion 12 corresponds to the height of the tallest operating member among the plurality of operating members 92A to 92D. In this example, the height h of the convex portion 12 corresponds to that of the operating sticks 92B, 92D. This structure can leave the operating sticks 92B, 92D free from a large load applied thereto from the cover plate 2 when the electronic device 90 is stored.

The convex portion 12 in this example is like a thick panel, of which dimension is substantially in conformity with that of the display screen 91. Therefore, the front cover plate 2 can be prevented from being inclined or being partially dented even when a force is externally applied to the external surface of the front cover plate 2 when the electronic device 90 is stored.

A cover 100 according to a second example of the present invention will be described. The cover 100 is formed capable of functioning as a stand of the electronic device 90.

Figure 9A:
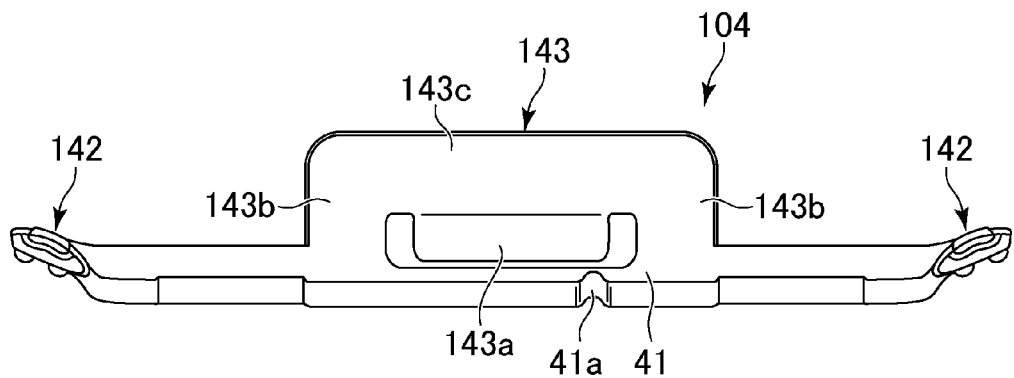
FIG. 9(a) is a plan view of the attachment member.
Figure 9B:
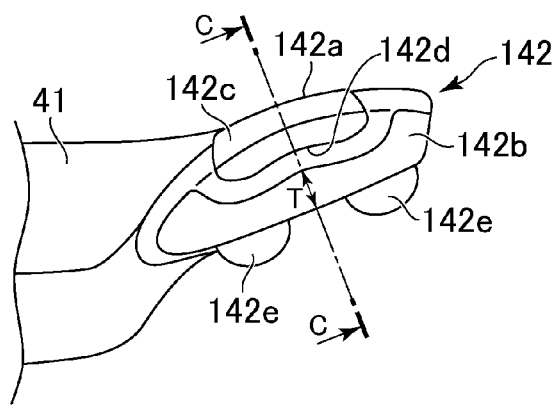
FIG. 9(b) is an enlarged view of a fixing portion of the attachment member.
Figure 9C:
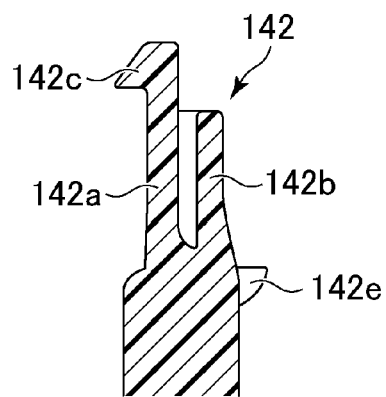
FIG. 9(c) is a cross sectional view along the line c-c shown in FIG. 9(b).
Figure 10:
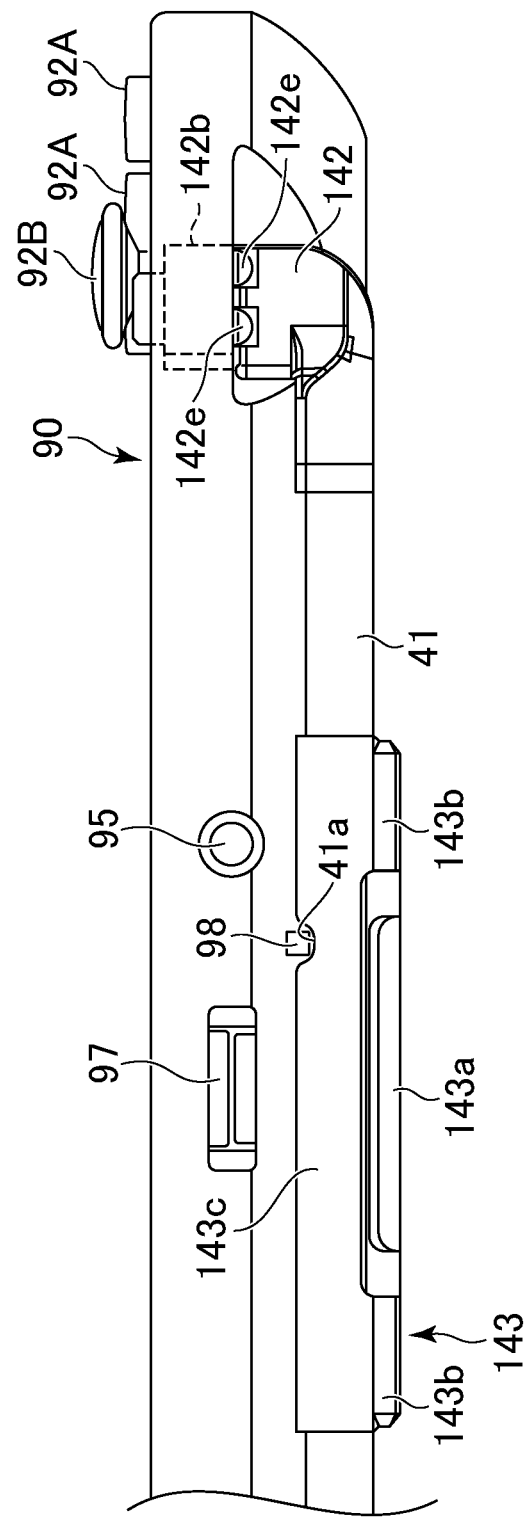
FIG. 10 is a diagram showing the attachment member shown in FIG. 9 attached to the electronic device.

FIG. 7 is a perspective view of the cover 100 kept open. FIG. 8 is a side view of the cover 100 functioning as a stand. FIG. 9 is a diagram showing an attachment member 104 of the cover 100. Specifically, FIG. 9(*a*) is a plan view of the attachment member 104. FIG. 9(*b*) is an enlarged view of a fixing portion 142 of the attachment member 104. FIG. 9(*c*) is a cross sectional view along the line c-c shown in FIG. 9(*b*). FIG. 10 is a diagram showing the attachment member 104 attached to the electric device 90. A member identical to that which is described above is given an identical reference numeral, of which description is omitted.

As shown in FIGS. 7 and 8, the cover 100 has a stand plate 121 for supporting the rear cover plate 3 standing while arranging the cover 100 with the first connection portion 51 down. In this example, the stand plate 121 is attached to the front cover plate 2, as to be described late in detail. The cover 100 further includes a retaining portion 131 arranged on the inner surface of the rear cover plate 3 (the inner surface here referring to a surface facing the rear surface of the electronic device 90 when the electronic device 90 is stored). The retaining portion 131 can retain the attachment member 104 in a posture which the attachment member 104 will take when the electronic device 90 is placed on the rear cover plate 3 (this posture of the attachment member 104 (the posture shown in FIGS. 7 and 8) hereinafter referred to as a support posture). By retaining the attachment member 104 by the retaining portion 131, the cover 100 can support the electronic device 90 standing.

As shown in FIG. 7, the retaining portion 131 in this example has an elongate belt-like shape that is long in the left right direction, with the both ends thereof attached to the inner surface of the rear cover plate 3. The retaining portion 131 is formed on the rear cover plate 3 in a position closer to the first connection portion 51. Meanwhile, the attachment member 104 includes an engagement portion 143 formed in the middle of the frame 41. The engagement portion 143 includes a fitting portion (tab) 143*a* (see FIG. 9(*a*)) formed thereon to be fitted into the retaining portion 131. The engagement portion 143 can be caught (engaged) on the retaining portion 131 such that the engagement portion 143 restricts downward movement of the attachment member 104 with the rear cover plate 3 standing. In this example, when the cover 100 is functioning as a stand, the first connection portion 51 is positioned on the lower side of the cover 100. Therefore, the fitting portion 143*a* of the engagement portion 143 can be fit into the retaining portion 131 from the side opposite from the first connection portion 51 toward the first connection portion 51. With this simple work of retaining the engagement portion 143 on the retaining portion 131, the attachment member 104 can be retained at the above described support posture. In this regard, when the engagement portion 143 is not caught on the retaining portion 131, the rear cover plate 3 can be separated from the rear surface of the electronic device 90, as shown in FIG. 1. Therefore, it is possible to operate the rear touch panel 93 of the electronic device 90 with the cover 100 kept attached to the electronic device 90.

As shown in FIG. 9(*a*), the engagement portion 143 in this example includes a pair of arms 143*b* extending from the frame 41 and a connecting portion 143*c* connecting the respective ends of the arms 143*b*. The fitting portion 143*a* extends from the connecting portion 143*c* toward the frame 41. The arm 143*b*, the connecting portion 143*c*, and the fitting portion 143*a* each is formed into a panel shaped portion and thus are all arranged in a substantially same flat plain. Therefore, while the fitting portion 143*a* remains caught on the retaining portion 131, the engagement portion 143 can remain in close contact with the inner surface of the rear cover plate 3. Consequently, unsteadiness of the attachment member 104 relative to the rear cover plate 3 can be reduced, so that the electronic device 90 can be stably supported. Further, since the engagement portion 143 is formed in the middle of the frame 41, the electronic device 90 can be supported well balanced, using a single engagement.

The attachment member 104 includes fixing portions 142 corresponding to the above described fixing portions 42 on the both ends thereof (see FIG. 9(*a*)). The fixing portion 142 is formed so as to stand relative to the rear cover plate 3 when the engagement portion 143 is caught on the retaining portion 131. In other words, the engagement portion 143 extends from the frame 41 in a direction substantially perpendicular to the extension direction of the fixing portion 42. When the fixing portion 142 remains standing relative to the rear cover plate 3, the electronic device 90 is placed along the rear cover plate 3 (see FIG. 8).

As shown in FIG. 7, the cover 100 as well includes the second connection portion 52. The second connection portion 52 in this example is divided into left and right parts, with the engagement portion 143 positioned between the left and right parts. The second connection portion 52 is flexible and formed into belt-shaped portion. The attachment member 104 is connected to the rear cover plate 3 through the second connection portion 52. Utilizing the flexibility of the second connection portion 52, the attachment member 104 can be moved to a position for the support posture.

The rear cover plate 3 and the front cover plate 2 are connected to each other so as to respectively move to angular position at which the outer surfaces thereof face each other (an outer surface here referring to a surface facing toward outside when the electronic device 90 is stored). Specifically, the rear cover plate 3 is connected to the front cover plate 2 through the first connection portion 51. Since the first connection portion 51 has flexibility as described above, the rear cover plate 3 and the front cover plate 2 can turn utilizing the flexibility to the angular position at which the outer surfaces thereof face each other, that is, positions shown in FIG. 8. As described above, the cover 100 includes the stand plate 121 for enabling the cover 100 to function as a stand. The stand plate 121 is attached to the inner surface of the front cover plate 2 (an inner surface here referring to a surface facing the front surface of the electronic device 90 when the electronic device 90 is stored). This structure can eliminate the need for providing a leg for standing the cover 100, that is, the stand plate 121 in this example, to the outer surface of the cover 100. Consequently, the cover 100 can have a preferable appearance when the electronic device 90 is stored in the cover 100.

The stand plate 121 can be opened and closed relative to the inner surface of the front cover plate 2. In detail, as shown in FIG. 7, the stand plate 121 includes an attached portion 121*a* formed on an edge thereof opposite from the first connection portion 51. The attached portion 121*a* is attached on the front cover plate 2. The stand plate 121 can be opened and closed around the attached portion 121*a* (see FIG. 8). Incidentally, in this example as well, the convex portion 12 is formed on the inner surface of the front cover plate 2. In this example, the front cover plate 2 includes the stand plate 121 in the middle thereof and the convex portions 12 respectively arranged on the left side and right side of the stand plate 121.

As shown in FIG. 8, a stopper belt 122 is provided between the stand plate 121 and the front cover plate 2. The stopper belt 122 makes a connection between the front cover plate 2 and a portion of the stand plate 121 away from the attached portion 121a. The stopper belt 122 limits the open angle of the stand plate 121 from the front cover plate 2. In this regard, a folding line (not shown) is defined in the middle of the stopper belt 122. In inclining the stand plate 121 toward the front cover plate 2, the stopper belt 122 is folded along the folding line and thereby is stored between the stand plate 121 and the front cover plate 2.

As shown in FIGS. 7 and 8, in this example as well, the holder belt 11 is attached to the front cover plate 2. The holder belt 11 extends from an edge of the front cover plate 2 opposite from the first connection portion 51. Meanwhile, the attachment portion 11a for attaching the holder belt 11 is formed on the outer surface of the rear cover plate 3, as described above. Therefore, when the front cover plate 2 and the rear cover plate 3 are arranged with the outer surface thereof facing each other, the holder belt 11 is bent into a substantial U-shape and thereby can be attached to the attachment portion 11a. Consequently, relative positions of the front cover plate 2 and the rear cover plate 3 can be stabilized.

As described above, the front cover plate 2 is connected to the rear cover plate 3 through the first connection portion 51. As shown in FIG. 8, when the cover 100 is functioning as a stand, the first connection portion 51 is bent into a substantial U-shape and arranged on the lower side of the cover 100. Therefore, the first connection portion 51 is in contact with the surface on which the cover 100 is placed. Therefore, when the cover 100 is used as a stand, the rear cover plate 3 is supported on the first connection portion 51. Accordingly, the first connection portion 51 can be used as a cushion member for reducing transmission of vibration and so forth to the electronic device 90. The first connection portion 51 in this example includes an elastic member (e.g., rubber). Therefore, more preferable cushion function can be attained, utilizing the elasticity of the first connection portion 51.

In this regard, when the stand plate 121 remains open, a tangent line on the substantially U-shaped outer surface (lower surface) of the first connection portion 51 can be defined to go through the end of the stand plate 121. Accordingly, when the cover 100 is placed on a surface, the first connection portion 51 contacts the surface. Moreover, the second connection portion 52 in this example is attached to the border between the rear cover plate 3 and the first connection portion 51, that is, to the edge of the rear cover plate 3 and the edge of the first connection portion 51, as shown in FIG. 8. And thereby, the first connection portion 51 contacts the surface on which the cover 100 is placed, and the second connection portion 52 does not hinder the contact, when the cover 100 is functioning as a stand.

As described above, the attachment member 104 as well has fixing portions 142 respectively formed on the both ends thereof for fitting into the fixing holes 94 (see FIG. 6). As shown in FIGS. 9(b) and 9(c), the fixing portion 142 includes a pair of projections 142a, 142b with an interval in-between, similar to the fixing portion 42. The projection 142a includes a prong 142c for being hooked on the front surface of the electronic device 90. As shown in FIG. 9(b), the projection 142a is slightly curved in conformity with the shape of the edge of the fixing hole 94 formed on the electronic device 90. Therefore, the surface 142d of the projection 142a toward the projection 142b is concaved. Meanwhile, the surface of the projection 142b toward the projection 142a swells toward the concave surface 142d of the projection 142a, and thereby the thickness T at the middle part of the projection 142b is bigger than thicknesses on the both sides of the middle. Consequently, the strength of the projection 142b can be reinforced so that elasticity of the projection 142a can be increased.

Further, the fixing portion 142 includes a convex portion 142e formed on the base thereof and projecting toward a side opposite to the prong 142c. The fixing portion 142 in this example has two convex portions 142e. The convex portion 142e and the prong 142c sandwich the electronic device 90 in the thickness direction of the electronic device 90 (see FIG. 8). That is, the prong 142c is hooked on the edge on the front side of the fixing hole 94, while the prong 142c is hooked on the edge of the rear side of the fixing hole 94.

As shown in FIG. 10, when the attachment member 104 is attached to the electronic device 90, the frame 41 is arranged along the lower surface of the electronic device 90. Connectors 95, 97 and a microphone 98 are provided on the lower surface of the electronic device 90. The frame 41 is formed avoiding the connectors 95, 97 and the microphone 98. Specifically, a concave portion 41a is formed on the frame 41 in this example to avoid the microphone 98.

As described above, according to the cover 1, 100 the front cover plate 2 and the rear cover plate 3 are connected to the attachment member 4, 104 such that each relative angles thereof relative to the attachment member 4, 104 is changeable. This allows the front cover plate 2 and the rear cover plate 3 to open or close relative to the front surface and the rear surface of the electronic device 90, respectively. Consequently, a user can not only look at the display screen 91 on the front surface of the electronic device 90, but also operate the rear touch panel 93 on the rear surface, when using the electronic device 90.

Further, the cover 1, 100 includes the first connection portion 51 for connecting the edge of the front cover plate 2 and that of the rear cover plate 3, and the attachment member 4, 104 is connected to the first connection portion 51. This structure can reduce imbalance between a load applied from the front cover plate 2 to the electronic device 90 and a load from the rear cover plate 3 to the electronic device 90.

Further, the cover 1, 100 has the second connection portion 52 extending from the attachment member 4, 104 toward the first connection portion 51. This structure makes it possible to prevent the cover plate 2, 3 from hindering an operation by user to the electronic device 90, when using the electronic device 90.

Further, the front cover plate 2 and the rear cover plate 3 are connected to the attachment member 4, 104 through the flexible connection member 5 (that is, the connection members 51, 52). This can simplify a structure for allowing the cover plates 2, 3 to open or close relative to the electronic device 90, while keeping the attachment member 4, 104 fixed to the electronic device 90.

Further, the attachment member 4, 104 has two fixing portions 42, 142 positioned apart from each other in the direction along the lower edge 90b of the electronic device 90 and capable of being fixed to the lower edge 90b of the electronic device 90. This structure can more stabilize the relative positions between the attachment member 4 and the electronic device 90, compared to a structure in which the attachment member 4 is attached to the electronic device 90 with a single fixing portion.

Further, the two fixing portions 42, 142 can be respectively attached to the both ends of the lower edge 90b of the electronic device 90. This structure can further stabilize the relative positions of the attachment member 4, 104 and the electronic device 90.

Further, the attachment member 4, 104 is formed so as to be hooked on the electronic device 90 to be thereby fixed to the electronic device 90. This structure can facilitate a work of attaching the attachment member 4, 104 to the electronic device 90.

Further, the attachment member 4, 104 has the fixing portion 4, 104 to be hooked on the edge of the fixing hole 94 formed on the edge of the electronic device 90. This structure can readily increase the strength in attachment of the attachment member 4, 104 to the electronic device 90.

Further, the cover 100 includes the retaining portion 131 for retaining the attachment member 104 in a posture which the attachment member 104 takes when the electronic device 90 is placed on the rear cover plate 3. Further, the cover 100 includes the stand plate 121 for supporting the rear cover plate 3 standing. With the above structure, the cover 100 can function as a stand.

Further, the attachment member 104 includes the engagement portion 143, the rear cover plate 3 includes the retaining portion 131, and the engagement portion 143 can be caught on the retaining portion 131 to thereby restrict the attachment member 104 from moving downward from the rear cover plate 3 standing. According to this structure, the cover 100 can be set with a simple work by user so as to function as a stand.

Further, the rear cover plate 3 and the front cover plate 2 are connected to each other so as to be respectively moved to angular position at which the outer surfaces of the rear cover plate 3 and the front cover plate 2 face each other, and the stand plate 121 is attached to the inner surface of the front cover plate 2. With the above structure, the cover 100 can have a preferable appearance when the electronic device 90 is stored in the cover 100.

Further, an edge of the rear cover plate 3 is connected to an edge of the front cover plate 2 through the flexible first connection portion 51. The first connection portion 51 is positioned on the lower side of the rear cover plate 3 and the front cover plate 2 when the rear cover plate 3 and the front cover plate 2 are standing. With the above structure, the first connection portion 51 can function as a cushion member.

Note that the present invention is not limited to the above described cover 1, 100, and can be modified in various manners.

For example, although the connection member 5 has the second connection portion 52 in the above description, the connection member 5 may not necessarily have the second connection portion 52. That is, the first connection portion 51 may be directly connected to the attachment member 4.

Further, the second connection portion 52 is connected to the first connection portion 51 in the above description. However, the second connection portion 52 may be connected to the edge of the front cover plate 2 or that of the rear cover plate 3.

Further, one of the front cover plate 2 and the rear cover plate 3 may be connected to the attachment member 4 through the other cover plate. For example, the attachment member 4 may be connected to the lower edge of the front cover plate 2, and the rear cover plate 3 may be connected to the right or left edge of the front cover plate 2 so that the rear cover plate 3 is connected to the attachment member 4 through the front cover plate 2. According to this structure, the rear cover plate 3 can change the angle thereof about the right or left edge of the front cover plate 2 to thereby consequently change the angle thereof relative to the attachment member 4.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A cover for receiving a portable electric device therein, the electric device having a display screen provided on a front surface thereof, an operating part provided on a rear surface thereof, and at least first and second fixing holes extending from the front surface through to the rear surface and being laterally spaced apart along an edge thereof, the cover comprising:

a front cover plate for covering the front surface of the electronic device;

a rear cover plate for covering the rear surface of the electronic device; and an attachment member capable of being attached to the edge of the electronic device, the attachment member including at least first and second fixing portions being laterally spaced apart from one another and being sized and shaped for insertion into the first and second fixing holes, respectively, in a front-rear direction, the first and second fixing portions including respective protrusions operating to hook onto respective edges of the first and second fixing holes, wherein the front cover plate is connected to the attachment member such that a relative angle between the front cover plate and the attachment member is changeable, and the rear cover plate is connected to the attachment member such that a relative angle between the rear cover plate and the attachment member is changeable.

2. The cover according to claim 1, further comprising a first connection portion for connecting an edge of the front cover plate and an edge of the rear cover plate, wherein the attachment member is connected to the first connection portion.

3. The cover according to claim 2, wherein the attachment member is connected to the first connection through a second connection portion extending between the attachment member and the first connection portion.

4. The cover according to claim 1, wherein the front cover plate and the rear cover plate are connected to the attachment member through a flexible connection member.

5. The cover according to claim 1, wherein the at least two fixing portions are capable of being respectively fixed to both ends of the lower edge of the electronic device.

6. The cover according to claim 1, further comprising a retaining portion capable of retaining the attachment member in a posture which the attachment member takes when the electric device is placed on the rear cover plate; and a stand portion for supporting the rear cover plate standing.

7. The cover according to claim 6, wherein the attachment member includes an engagement portion, the retaining portion is formed on the rear cover plate, and the engagement portion is formed so as to be caught on the retaining portion to thereby restrict the attachment member from moving downward from the rear cover plate standing.

8. The cover according to claim 6, wherein the rear cover plate and the front cover plate are connected to each other so as to respectively move to angular position at which outer surfaces thereof face each other, and the stand portion is provided to an inner surface of the front cover plate.

9. The cover according to claim 2, wherein the first connection portion is made of a flexible material.

10. The cover according to claim 3, wherein the second connection portion is made of a flexible material.

11. The cover according to claim 1, further comprising:
a first connection portion for connecting the front cover plate and the rear cover plate, and;
a second connection portion extending from the attachment member toward the first connection portion, connected to the first connection portion at a first connection position, and connected to the attachment member at a second connection position distant from the first connection position, wherein:
the first connection portion and the second connection portion operate to move with respect to one another about the first connection position, and
the second connection portion and the attachment member operate to move with respect to one another about the second connection position.

* * * * *